(12) United States Patent
Kinno et al.

(10) Patent No.: US 11,695,152 B2
(45) Date of Patent: Jul. 4, 2023

(54) CASE AND METHOD FOR MANUFACTURING THE SAME, METHOD FOR INSERTING STACKED BODY, AND CELL STACK

(71) Applicant: TOYOTA JIDOSHA KABUSHIKI KAISHA, Toyota (JP)

(72) Inventors: Tomoki Kinno, Toyota (JP); Yusuke Matsumoto, Okazaki (JP); Natsuhiko Katahira, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 444 days.

(21) Appl. No.: 16/800,120

(22) Filed: Feb. 25, 2020

(65) Prior Publication Data
US 2020/0303689 A1   Sep. 24, 2020

(30) Foreign Application Priority Data

Mar. 22, 2019 (JP) ................................ 2019-054179

(51) Int. Cl.
| | |
|---|---|
| *H01M 50/116* | (2021.01) |
| *H01M 50/117* | (2021.01) |
| *H01M 50/119* | (2021.01) |
| *H01M 50/121* | (2021.01) |
| *H01M 50/122* | (2021.01) |
| *H01M 50/124* | (2021.01) |
| *H01M 50/126* | (2021.01) |

(Continued)

(52) U.S. Cl.
CPC ....... *H01M 10/0562* (2013.01); *H01M 4/386* (2013.01); *H01M 10/0481* (2013.01); *H01M 10/0587* (2013.01); *H01M 50/209* (2021.01); *H01M 50/222* (2021.01); *H01M 50/227* (2021.01); *H01M 50/229* (2021.01); *H01M 2004/027* (2013.01)

(58) Field of Classification Search
None
See application file for complete search history.

(56) References Cited

U.S. PATENT DOCUMENTS

| 6,099,986 A | 8/2000 | Gauthier et al. |
| 2009/0123833 A1* | 5/2009 | Mao .................... H01M 10/052 429/163 |

(Continued)

FOREIGN PATENT DOCUMENTS

| CN | 105957984 A | 9/2016 |
| JP | 2001-511635 A | 8/2001 |

(Continued)

OTHER PUBLICATIONS

English translation of JP 2014/160572 (Year: 2014).*
English translation of JP 2017/212120 (Year: 2017).*
English translation of JP 2014/107085 (Year: 2014).*

*Primary Examiner* — Yoshitoshi Takeuchi
(74) *Attorney, Agent, or Firm* — Sughrue Mion, PLLC

(57) ABSTRACT

A case having elasticity corresponding to expansion and contraction of a stacked body housed therein and a method for manufacturing the same, a method for inserting the stacked body into the case, and a cell stack using the case are provided. A case configured to house a stacked body includes two opposed contact parts in contact with the stacked body, and two spring structures connecting the two contact parts with each other.

2 Claims, 6 Drawing Sheets

(51) Int. Cl.
*H01M 50/128* (2021.01)
*H01M 50/129* (2021.01)
*H01M 50/131* (2021.01)
*H01M 50/133* (2021.01)
*H01M 50/134* (2021.01)
*H01M 50/136* (2021.01)
*H01M 50/14* (2021.01)
*H01M 50/141* (2021.01)
*H01M 50/143* (2021.01)
*H01M 50/145* (2021.01)
*H01M 50/229* (2021.01)
*H01M 10/0562* (2010.01)
*H01M 10/04* (2006.01)
*H01M 4/38* (2006.01)
*H01M 10/0587* (2010.01)
*H01M 50/209* (2021.01)
*H01M 50/222* (2021.01)
*H01M 50/227* (2021.01)
*H01M 4/02* (2006.01)

(56) References Cited

U.S. PATENT DOCUMENTS

| | | | | |
|---|---|---|---|---|
| 2011/0177377 | A1* | 7/2011 | Dube | H01M 10/0481 |
| | | | | 429/153 |
| 2014/0087231 | A1 | 3/2014 | Schaefer et al. | |
| 2017/0117511 | A1* | 4/2017 | Takahashi | H01M 10/0436 |
| 2018/0026301 | A1 | 1/2018 | Ebisuzaki et al. | |
| 2018/0151856 | A1* | 5/2018 | Fischer | H01M 10/0481 |
| 2018/0269518 | A1* | 9/2018 | Haag | H01M 50/264 |

FOREIGN PATENT DOCUMENTS

| | | | | |
|---|---|---|---|---|
| JP | 2012-051622 | A | 3/2012 | |
| JP | 2014-513380 | A | 5/2014 | |
| JP | 2014/107085 | * | 6/2014 | H01M 10/0562 |
| JP | 2014-107085 | A | 6/2014 | |
| JP | 2014/160572 | * | 9/2014 | H01M 10/052 |
| JP | 2017/212120 | * | 11/2017 | H01M 10/04 |
| JP | 2017-212120 | A | 11/2017 | |
| JP | 2018-014286 | A | 1/2018 | |
| JP | 2018-107003 | A | 7/2018 | |
| KR | 10-2012-0056596 | A | 6/2012 | |

* cited by examiner

CASE AND METHOD FOR MANUFACTURING THE SAME, METHOD FOR INSERTING STACKED BODY, AND CELL STACK

CROSS REFERENCE TO RELATED APPLICATIONS

This application is based upon and claims the benefit of priority from Japanese patent application No. 2019-54179, filed on Mar. 22, 2019, the disclosure of which is incorporated herein in its entirety by reference.

BACKGROUND

The present disclosure relates to a case and a method for manufacturing the same, a method for inserting a stacked body, and a cell stack.

In an all-solid-state battery, in order to advance its cell reaction, it is necessary to apply a pressure of, for example, about 0.8 to 40 MPa in the stacking direction of the layers constituting the all-solid-state battery.

Japanese Unexamined Patent Application Publication No. 2018-14286 discloses, as a restraining member that applies a restraining pressure in the stacking direction of a stacked body constituting an all-solid-state battery, a restraining member including two plate-like parts that sandwich both surfaces of the stacked body, a rod-like part that connects the two plate-like parts to each other, and an adjusting part that is connected to the rod-like part and adjusts the restraining pressure by using a screw structure or the like.

Japanese Unexamined Patent Application Publication No. 2018-107003 discloses a technique for hermetically housing a stacked body of an all-solid-state battery in an exterior can. In the technique disclosed in Japanese Unexamined Patent Application Publication No. 2018-107003, the stacked body of the all-solid-state battery is hermetically housed in the exterior can by putting the stacked body of the all-solid-state battery in a main body of the exterior can and then welding a lid constituting an upper surface part of the exterior can to the main body thereof.

Further, Japanese Unexamined Patent Application Publication No. 2017-212120 discloses, as a technique for improving in-plane uniformity of a restraining load applied to battery cells, a battery including a plurality of battery cells and spacers each of which is disposed between two respective adjacent battery cells, in which each of the spacers includes low spring-constant convex parts and high spring-constant convex parts that come into contact with a battery case.

SUMMARY

It has been known that an all-solid-state battery expands and contracts depending on the operating condition and/or the operating environment. The shape of the restraining member disclosed in Japanese Unexamined Patent Application Publication No. 2018-14286 and that of the exterior can disclosed in Japanese Unexamined Patent Application Publication No. 2018-107003 substantially do not change. Therefore, when the all-solid-state battery expands, an excessively high restraining pressure may occur. Since a high restraining pressure acts as a load on both the all-solid-state battery and the restraining member, at least one of them may deteriorate and hence the battery performance may deteriorate. Further, when the all-solid-state battery contracts, a satisfactory restraining pressure may not be applied.

The present disclosure has been made in order to solve the above-described problem and one of the objects thereof is to provide a case having elasticity corresponding to expansion and contraction of a stacked body housed therein and a method for manufacturing the same, a method for inserting the stacked body into the case, and a cell stack using the case.

A first exemplary aspect is a case configured to house a stacked body, including:

two opposed contact parts in contact with the stacked body; and two spring structures connecting the two contact parts with each other.

According to the case having the above-described configuration, the spring structures deform according to a force applied to the contact parts. For example, when the housed stacked body expands, the spring structures expand, thus preventing the pressure applied to the stacked body from excessively increasing. On the other hand, when the housed stacked body contracts, the spring structures contract and hence the contact between the stacked body and the contact parts is maintained, thus preventing or reducing the decrease in the pressure applied to the stacked body.

The case may be made of fiber reinforced plastic. The case made of fiber reinforced plastic has a higher strength.

Another exemplary aspect is a method for manufacturing a case, including: winding a carbon fiber impregnated with a resin around a mold; and curing the resin.

According to the above-described method for manufacturing a case, it is possible to manufacture a case that is made of fiber reinforced plastic and hence has a high strength.

In the above-described method for manufacturing a case, the carbon fiber impregnated with the resin may be in the form of a sheet. The manufacturing time can be reduced by using the sheet-like carbon fiber.

In the above-described method for manufacturing a case, in the winding of the carbon fiber around the mold, the carbon fiber may be wound around the mold while being pressed to the mold so as to conform to a shape thereof. According to the above-described manufacturing method, the case can be easily manufactured even when the spring structures of the case have a concave part.

The above-described method for manufacturing a case may further include, after the winding of the mold around the mold, using the mold as a core mold and pressing the carbon fiber by using an outer mold. According to the above-described manufacturing method, the case can be easily manufactured even when the spring structures of the case have a concave part.

Further, a method for manufacturing a case according to an embodiment may include injection-molding the case from a resin composition containing a carbon fiber.

Another exemplary aspect is a method for inserting a stacked body into a case, including preparing the case and the stacked body, and inserting the stacked body into the case in a state where the spring structures of the case are forcibly expanded. By inserting the stacked body into the case in the above-described manner, the pressing from the case to the stacked body can be maintained even when the stacked body contracts from its initial state.

Further, another exemplary aspect is a method for inserting a stacked body into a case, including preparing the case and the stacked body, and inserting the stacked body into the case in a state where the stacked body is forcibly compressed in a stacking direction. By inserting the stacked body in the above-described manner, the pressing from the case to the stacked body can be maintained even when the stacked body contracts from its initial state.

Another exemplary aspect is a cell stack including:

a case including two opposed contact parts and two spring structures connecting the two contact parts with each other; and a stacked body in which at least two all-solid-state fuel-cell unit cells are stacked, in which the stacked body is inserted into the case and both ends of the stacked body in a stacking direction come into contact with the two contact parts, respectively, and the two contact parts are pressed in the stacking direction of the stacked body.

According to the cell stack having the above-described configuration, the spring structures of the case expand or contract when each battery cell in the stacked body expands or contracts, so that the change in the pressure exerted from the case to the stacked body is reduced. As a result, the pressure applied to the stacked body is maintained within an appropriate range.

In the above-described cell stack, the all-solid-state fuel-cell unit cell may be a sulfide battery cell containing silicon in its negative electrode. According to the cell stack in accordance with an embodiment, even in the case of a sulfide battery cell containing silicon in its negative electrode, which has a relatively large expansion coefficient during the charging, it is possible to apply an appropriate pressure to the stacked body in response to expansion and contraction of the stacked body.

According to the present disclosure, it is possible to provide a case having elasticity corresponding to expansion and contraction of a stacked body housed therein and a method for manufacturing the same, a method for inserting the stacked body into the case, and a cell stack using the case.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, the present disclosure will be explained through embodiments of the present disclosure. However, they are not intended to limit the scope of the present disclosure according to the claims. Further, the following descriptions and drawings are simplified as appropriate for clarifying the explanation.

Note that in the present disclosure, the term "curing" includes a case where resins are cured through a chemical reaction, a case where a resin and a crosslinking agent are cured through a chemical reaction, and a case where a resin is cured by cooling it to its glass transition temperature or lower without undergoing any chemical reaction.

Figure 1:
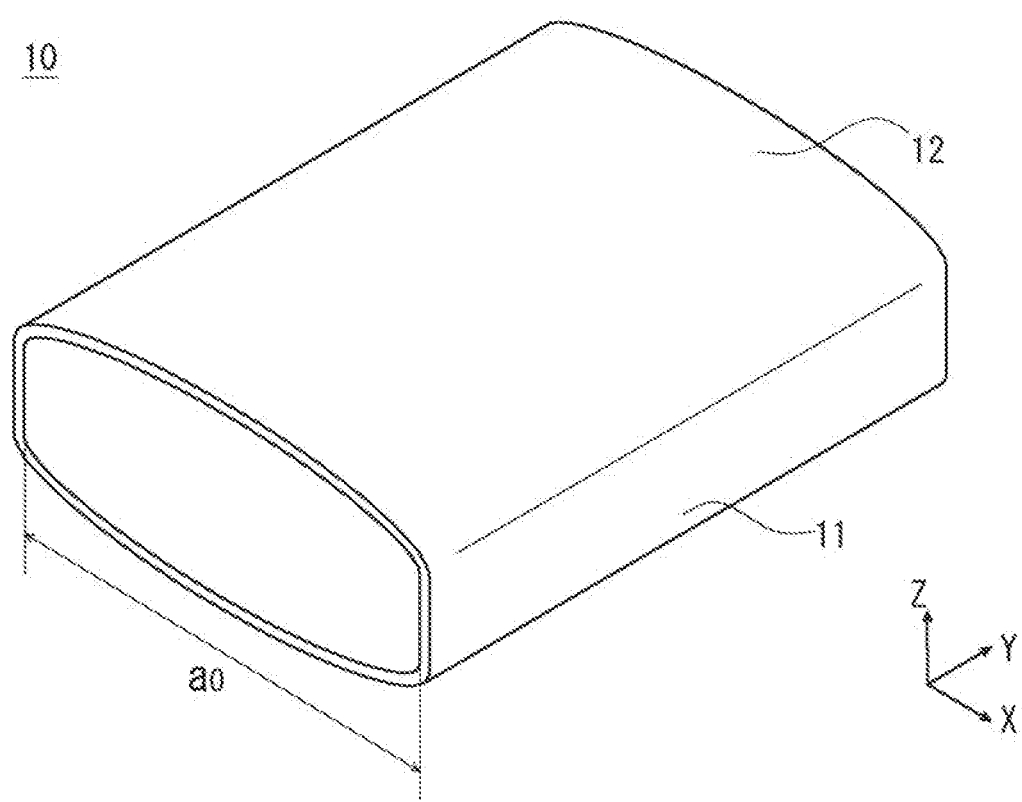
FIG. 1 is a perspective view showing an example of a case according to an embodiment.

Firstly, a structure of a case according to this embodiment will be described. FIG. 1 is a cross section schematically showing a case according to this embodiment. In the following description, a three-dimensional (XYZ) coordinate system will be used to clarify the description. Note that the scale in each axial direction may be different from one another.

A case 10 shown in FIG. 1 is a case for housing a stacked body. The case 10 includes two contact parts 11 that respectively come into contact with both ends of the stacked body in the stacking direction after the stacked body is housed in the case, and two spring structures 12 that connect the two contact parts 11 with each other. The two contact parts 11 are disposed in places where they are opposed to each other, and the two spring structures 12 are disposed so as to be opposed to each other. The two contact parts 11 and the two spring structures 12 constitute the cylindrical case 10 as a whole. A stacked body 20 is disposed inside the cylinder (see FIG. 2).

The case 10 can be made of any material with which a required strength can be achieved. In the case of a cell stack, which will be described later, the stacked body repeatedly expands and contracts in a state where a high restraining pressure is applied to the stacked body. Therefore, the case is required to have a strength by which the case can withstand the repeated expansion and contraction. In this case, metal or fiber reinforced plastic (e.g., CFRP (Carbon Fiber Reinforced Plastic)) may be used as the material for the case. Further, in view of the strength, the contact parts 11 and the spring structures 12 of the case 10 may be integrally molded. Note that a method for manufacturing a case will be described later.

Figure 2:
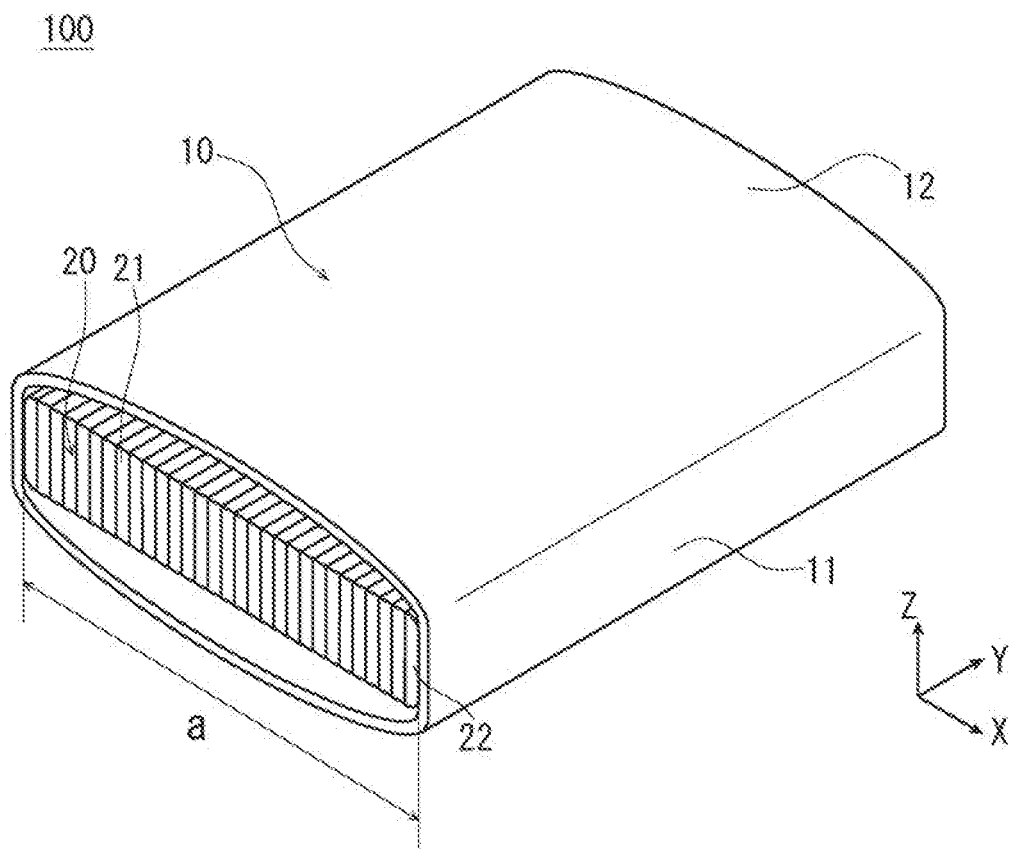
FIG. 2 is a perspective view showing an example of a cell stack according to an embodiment.
Figure 3:
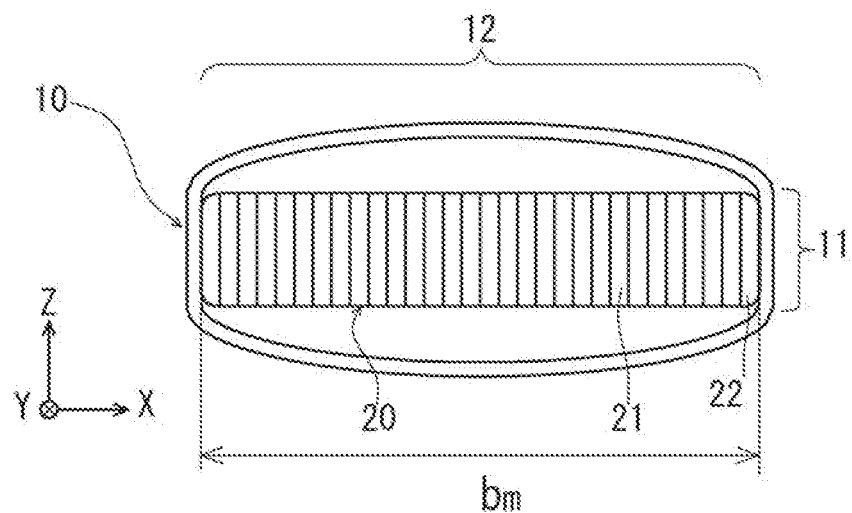
FIG. 3 is a front view of the cell stack shown in FIG. 2.

FIG. 2 is a perspective view showing an example of a cell stack according to this embodiment. Further, FIG. 3 is a front view of the cell stack shown in FIG. 2. The two contact parts 11 are in contact with the end parts of the stacked body 20 in the stacking direction. The contact parts 11 are pressed in the stacking direction of the stacked body 20 by the restoring forces of the spring structures 12.

In this embodiment, the spring structures 12 expand and contract according to forces of the spring structures 12 in the longitudinal direction (an X-axis direction), and generate the restoring forces. For example, in the case of metal or CFRP, since the elongation rate of the material itself is small, the spring structure 12 is achieved by using its shape. Specific examples of the shape of the spring structure 12 include a curved shape as shown in the example of FIG. 1, a bent shape as shown in an example of FIG. 5, and a corrugated shape (a concavo-convex shape) as shown in an example of FIG. 6.

The stacked body 20 is formed by stacking at least two plate-like members. Any type of plate-like members may be used as the above-described plate-like members. In this embodiment, since the case has elasticity corresponding to expansion and contraction of the stacked body, the all-solid-state battery cells 21 that expand or contract according to the operating environment can be suitably used as the plate-like members. In this embodiment, even sulfide battery cells containing silicon in their negative electrodes having a high expansion coefficient can be suitably used.

The stacked body 20 may be a stacked body composed of the all-solid-state battery cells 21, or may be a stacked body further including end plates 22 at both ends in the stacking direction of the stacked body of the all-solid-state battery cells 21. Examples of the material for the end plates 22 include metal, CFRP, etc. Further, the edges of the contact surfaces of the end plates 22 that come into contact with the case 10 may be chamfered (R-machining). By disposing such end plates, it is possible to prevent the load on the case 10 from being concentrated at parts of the case 10.

Note that a distance between the contact parts 11 (hereinafter, also referred to as a major axis) is represented by "a". In FIG. 1, "$a_0$" represents a distance between the contact parts 11 when no force is applied to the case 10 (hereinafter, also referred to as an initial state).

Further, a thickness of the stacked body in the stacking direction (hereinafter, also simply referred to as a thickness) is represented by "b". In FIG. 3, "$b_m$" is a thickness of the stacked body 20 in a state where the stacked body 20 contracts as much as possible.

The major axis "a" of the case 10 in a state where the stacked body 20 is housed therein is equal to the thickness "b" of the stacked body 20. As shown in FIG. 3, the case 10 according to this embodiment may press the stacked body even when the thickness of the stacked body has the minimum value "$b_m$". Because of this feature, the distance "$a_0$" between the contact parts 11 in the initial state may be smaller than the minimum value "$b_m$" for the thickness of the stacked body.

The case 10 according to this embodiment may be designed while taking the thickness "$b_m$" of the stacked body to be housed into consideration.

Figure 4:
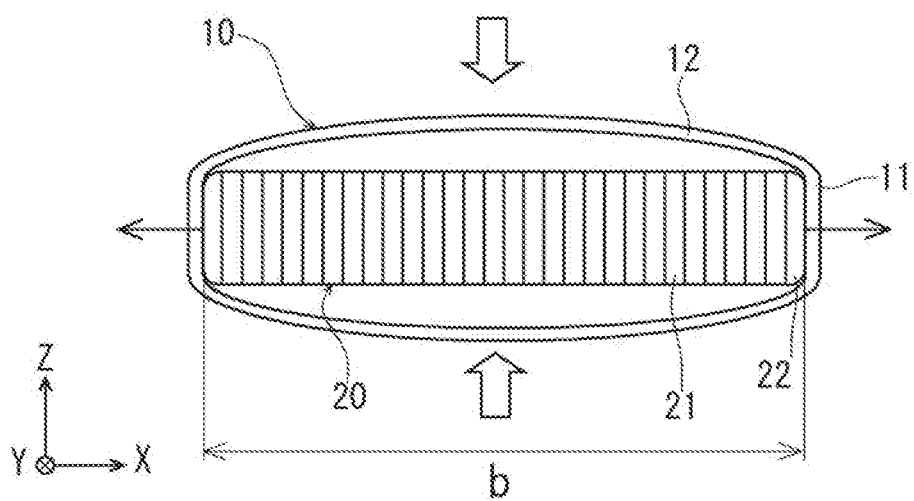
FIG. 4 is a front view for explaining changes in the case when the stacked body has expanded.

FIG. 4 is a front view for explaining changes in the case when the stacked body has expanded. As shown in FIG. 4, the stacked body 20 housed in the case 10 may expand according to the operating environment. If the restraining member is not substantially deformed as in the case of Japanese Unexamined Patent Application Publication Nos. 2018-14286 and 2018-107003, the stacked body 20 cannot easily expand in the stacking direction and hence an excessively high restraining pressure may occur.

In contrast, when the stacked body 20 housed in the case 10 according to this embodiment expands, the spring structure 12 is forcibly expanded and the length of the major axis "a" of the case 10 increases to the after-expansion thickness "b" of the stacked body. As a result, the change in pressure is reduced and hence it is possible to prevent an excessively high restraining pressure from being applied to the stacked body 20.

Next, two different methods for inserting a stacked body 20 into a case 10 according to this embodiment will be described. According to the below-shown insertion methods, a stacked body that satisfies a relation (Initial major axis "$a_0$" of case 10)<(Minimum thickness "$b_m$" of stacked body 20) can be inserted into the case.

Figure 5:
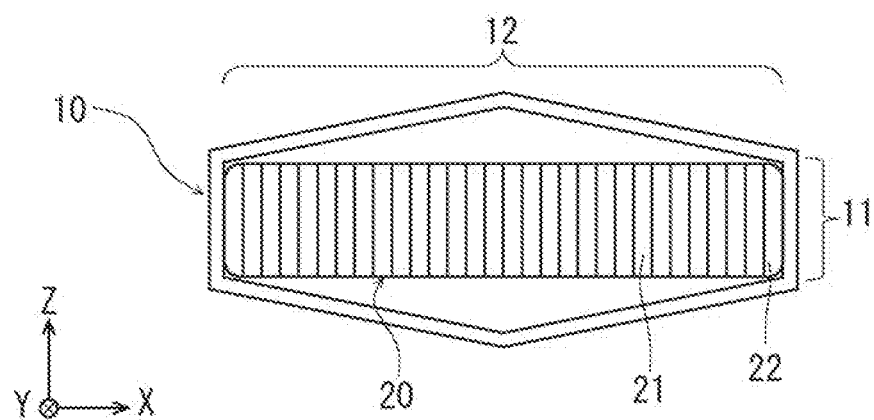
FIG. 5 is a front view showing a modified example of the case.
Figure 6:
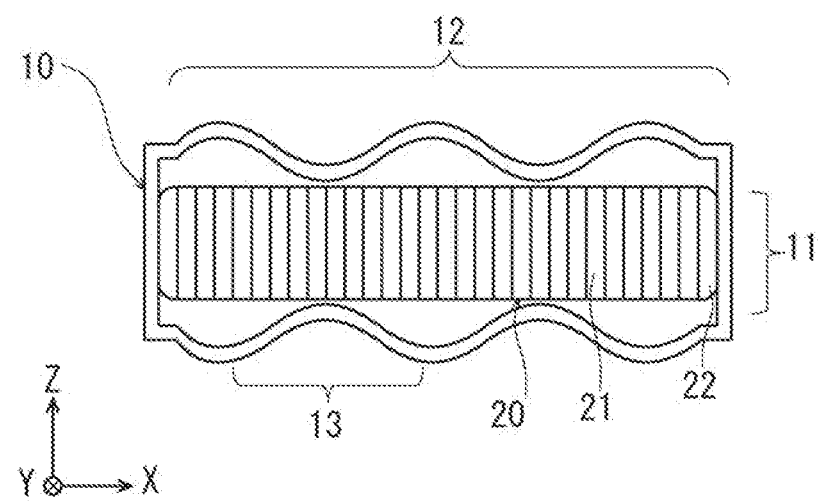
FIG. 6 is a front view showing another modified example of the case.
Figure 7:
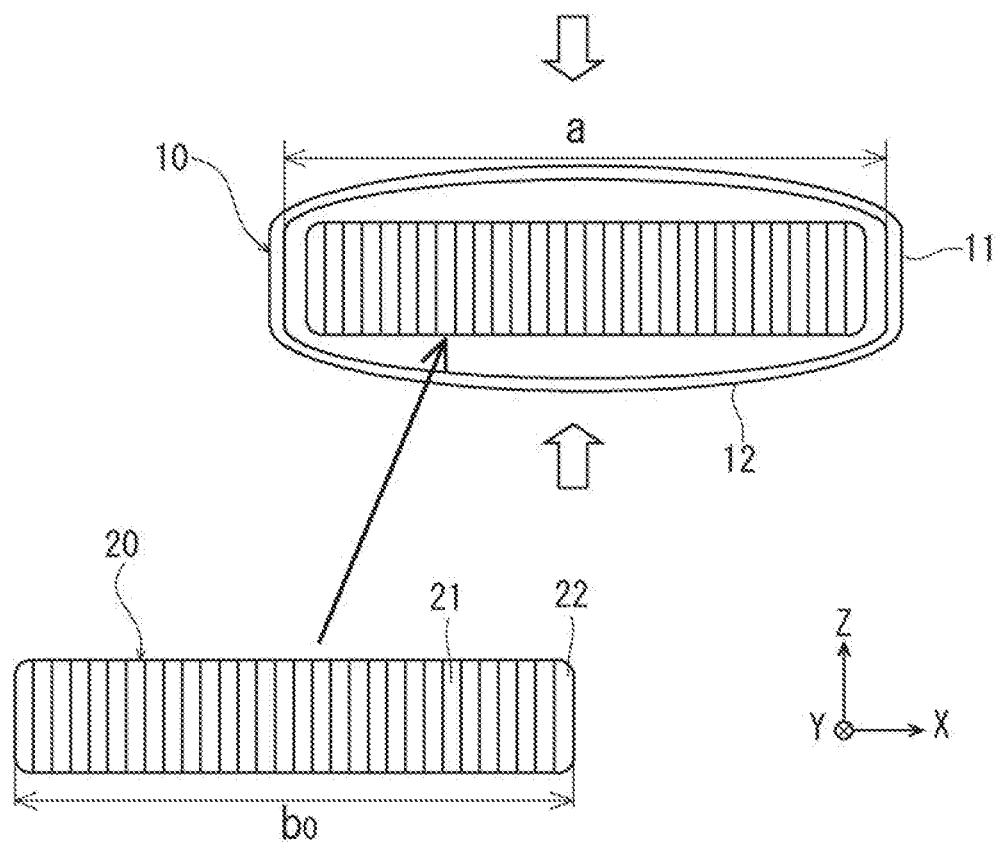
FIG. 7 is a front view for explaining a first method for inserting a stacked body.

The first insertion method is described with reference to FIG. 7. FIG. 7 is a front view for explaining the first method for inserting a stacked body into a case. In FIG. 7, "$b_0$" indicates a thickness of the stacked body in its initial state. In the first insertion method, the spring structure 12 of the case 10 is forcibly expanded and the stacked body 20 is inserted into the case 10 in a state where the major axis "a" of the case 10 is increased to the thickness "$b_0$" or longer. According to this method, the stacked body 20 can be easily inserted. This insertion method can be suitably used, in particular, when the spring structure has a convex shape as shown in FIG. 1 or 5. However, in the case of a concavo-convex shape as shown in an example of FIG. 6, the case may not be forcibly expanded sufficiently. In such a case, the below-shown second insertion method may be used.

Figure 8:
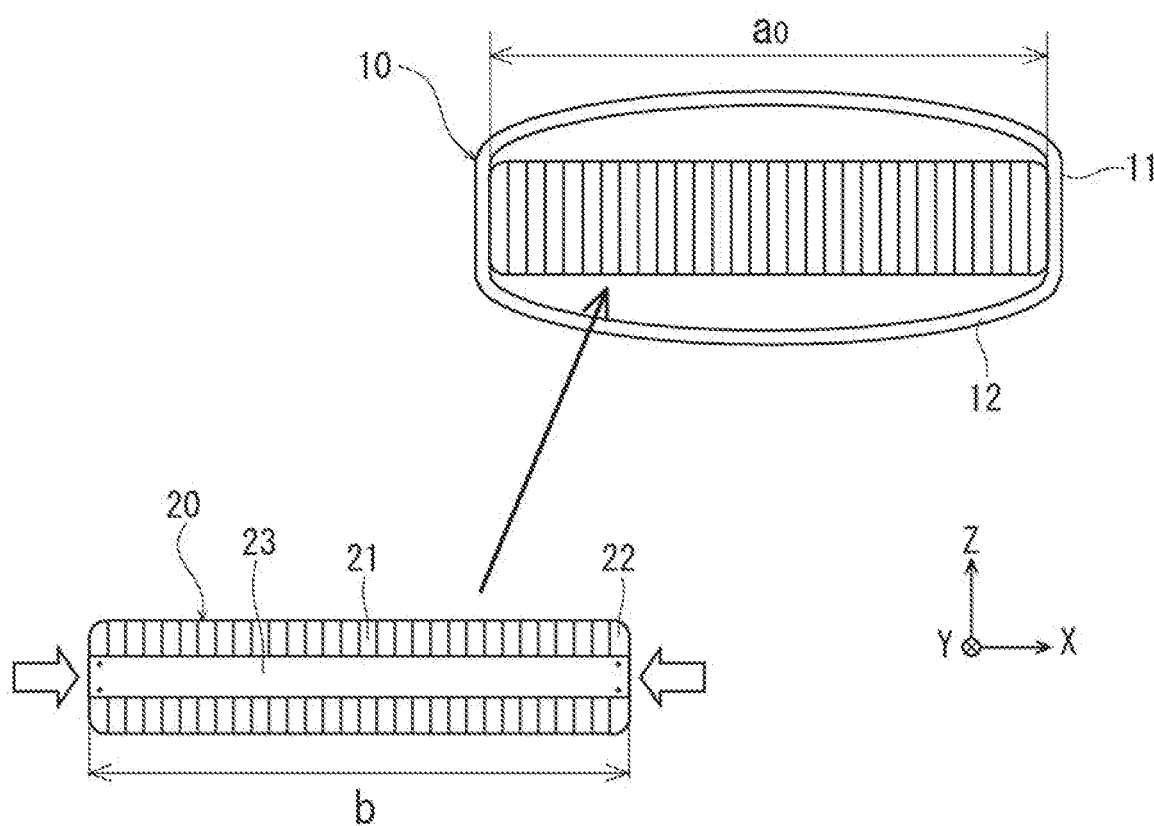
FIG. 8 is a front view for explaining a second method for inserting a stacked body.

The second insertion method is described with reference to FIG. 8. FIG. 8 is a front view for explaining a second method for inserting a stacked body into a case. In the second insertion method, the stacked body 20 is inserted into the case 10 in a state where the stacked body 20 is forcibly compressed to the thickness "$a_0$" or shorter by a compressing mechanism 23. The insertion is completed by removing the compressing mechanism 23 after the insertion. According to this method, it is possible to insert the stacked body 20 into the case 10 even when the case 10 has a shape due to which the case 10 cannot be forcibly expanded with ease.

Further, the above-described first and second insertion methods may be combined with each other. That is, by forcibly expanding the case 10 and forcibly compressing the stacked body 20, the stacked body 20 is inserted into the case 10 in a state where a relation (Thickness "b" of stacked body)<(Major axis "a" of case) holds. According to this method, it is possible to insert the stacked body into the case without imposing an excessive load on the stacked-body side.

Next, an example method for manufacturing a case according to this embodiment is described. Firstly, a method for manufacturing a case made of fiber reinforced plastic will be described. After that, a method for manufacturing a case made of metal will be described.

The first manufacturing method includes winding carbon fibers impregnated with a resin around a mold, and curing the resin.

The resin with which the carbon fibers are impregnated may be a thermosetting resin or a thermoplastic resin. In the case of the thermosetting resin, a crosslinking agent (a thermosetting agent) is usually used in combination with the resin.

In this manufacturing method, a mold (a mandrel) for a case 10 is prepared. Separately from the preparation of the mold, carbon fibers are immersed in a thermosetting resin, or a thermoplastic resin fluidized by heating, so that the carbon fibers are impregnated with the resin. Next, the carbon fibers are wound around the mold by a filament winding method (an FW method) while rotating the mold so that the wound carbon fibers have a predetermined thickness. Next, the case 10 can be manufactured by curing the resin. According to the first manufacturing method, since long carbon fibers are wound around the case 10, the case 10 having an excellent mechanical strength can be obtained.

The second manufacturing method is a method in which: sheet-like carbon fibers (prepreg) are prepared as carbon fibers impregnated with a resin; the sheet-like carbon fibers are wound around a mold by a sheet winding method (an SW method); and then the resin is cured. According to this method, the productivity is improved as compared to that of the first manufacturing method.

The first and second manufacturing methods can be suitably used, in particular, when the spring structure has a convex shape as shown in FIGS. 1 and 5. In contrast, in the case of a concavo-convex shape as shown in an example of FIG. 6, it is difficult to form concave parts 13.

In a third manufacturing method, in the step of winding carbon fibers around a mold, the carbon fibers are wound around the mold while being pressed to the mold so as to conform to the shape thereof. According to this method, it is possible to suitably manufacture a case 10 of which spring structures have a concavo-convex shape. Specifically, in the above-described FW method or the SW method, a pressing mechanism is disposed at a place where the mold and carbon fibers come into contact with each other, and the carbon fibers are made to conform to the shape of the mold by pressing the carbon fibers onto the mold. In this manufacturing method, a local heating mechanism may be used so that the carbon fibers are not detached from the concave parts. When the resin is a thermoplastic resin, the thermoplastic resin is fluidized by heating the carbon fibers before they are brought into contact with the mold. Further, when the resin is a thermosetting resin, it is heated after the carbon fibers are brought into contact with the mold. As the heating means, for example, a laser, an IR lamp, etc. can be used.

In a fourth manufacturing method, after carbon fibers are wound around a mold by the FW method or the SW method, the mold is used as a core mold and the carbon fibers are pressed by using an outer mold. In this method, the carbon fibers enter the concave parts during the pressing. Therefore, the carbon fibers do not necessarily have to conform to the concave parts when they are wound around the mold.

According to the third or fourth manufacturing method described above, it is possible to suitably manufacture a case having a concavo-convex shape.

Further, a fifth manufacturing method is, for example, a method for injection-molding a case from a resin composition containing carbon fibers. Although the strength of the case is slightly poorer than those of the above-described first to fourth manufacturing methods because the length of the carbon fibers is short, the productivity is excellent. Therefore, this manufacturing method can be adopted according to the use of the case.

Further, in the case of manufacturing a case made of metal, firstly, a metal plate having a predetermined size is prepared. Then, after an external shape of the case is formed by pressing the metal plate, the pressed metal plate is formed into a cylindrical shape by welding end parts thereof to each other.

Next, a cell stack according to this embodiment is described with reference to FIG. 2. A cell stack 100 according to this embodiment includes a case 10 including two opposed contact parts 11 and two spring structures 12 connecting the two contact parts 11 with each other; and a stacked body 20 in which at least two all-solid-state battery cells 21 are stacked, in which: the stacked body 20 is inserted into the case 10 and both ends of the stacked body 20 in a stacking direction come into contact with the two contact parts 11, respectively; and the two contact parts 11 are pressed in the stacking direction of the stacked body 20.

According to the cell stack 100 in accordance with this embodiment, the spring structures 12 of the case 10 expand or contract when each battery cell 21 in the stacked body 20 expands or contracts, so that the change in the pressure exerted from the case 10 to the stacked body 20 is reduced. As a result, the pressure applied to the stacked body is maintained within an appropriate range (e.g., about 0.8 to 40 MPa). This embodiment can be suitably applied to a sulfide battery cell containing silicon in its negative electrode having a high expansion coefficient.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A cell stack comprising:
   a case including two opposed contact parts and two spring structures connecting the two opposed contact parts with each other; and
   a stacked body in which at least two all-solid-state battery cells are stacked, wherein
   the stacked body is inserted into the case and both ends of the stacked body in a stacking direction come into contact with the two opposed contact parts, respectively, and
   the two opposed contact parts are pressed in the stacking direction of the stacked body,
   wherein the case is made of fiber reinforced plastic,
   the two opposed contact parts and the two spring structures are integrally molded, and
   the two spring structures expand or contract when each of the battery cells expands or contracts, so that a pressure applied to the stacked body by the case is maintained within a range of 0.8 to 40 MPa.

2. The cell stack according to claim 1, wherein the all-solid-state battery cell is a sulfide battery cell containing silicon in its negative electrode.

* * * * *